Jan. 7, 1964     E. E. HAGER     3,116,744

WASHING MACHINE FOR SMALL ARTICLES

Filed Oct. 26, 1962     2 Sheets-Sheet 1

INVENTOR.
Earl E. Hager
BY
Mawrinney & Mawrinney
ATTORNEYS

Jan. 7, 1964     E. E. HAGER     3,116,744
WASHING MACHINE FOR SMALL ARTICLES
Filed Oct. 26, 1962     2 Sheets-Sheet 2

INVENTOR.
Earl E. Hager
BY
*Mawrinney & Mawrinney*
ATTORNEYS

United States Patent Office 3,116,744
Patented Jan. 7, 1964

3,116,744
WASHING MACHINE FOR SMALL ARTICLES
Earl E. Hager, R.R. 1, Box 91E, Riddle, Oreg.
Filed Oct. 26, 1962, Ser. No. 233,295
5 Claims. (Cl. 134—121)

The present invention relates to washing machine for small articles, and has for an object to provide a machine for primarily washing dental plates but appropriate also for washing jewelry or other small articles.

An object of the invention is to provide a machine for the above purposes constructed and arranged for compactness so that it is sufficiently small in over-all dimensions to be easily accommodated in the type of medicine or bathroom cabinet ordinarily found in the home.

Another object of the invention is to provide a conveniently accessible machine for the dental wearer providing a sure way of obtaining at all times clean conditions of the dental plates without the bother of scrubbing them with a paste or powder in which operations many such plates are dropped in the wash basin and become chipped or broken.

A further object of the invention is to provide an automatic machine which supplants and is superior to the procedure, often used at the present time, of depositing overnight the dentures in a bowl containing water and a cleansing solution in which the dental plates are never properly or thoroughly cleansed.

The invention furthermore provides a machine in which the plates may be thoroughly cleaned and deodorized.

With the foregoing and other objects in view, the invention will be more fully described hereinafter, and will be more particularly pointed out in the claims appended hereto.

In the drawings, wherein like symbols refer to like or corresponding parts throughout the several views.

Figure 5:
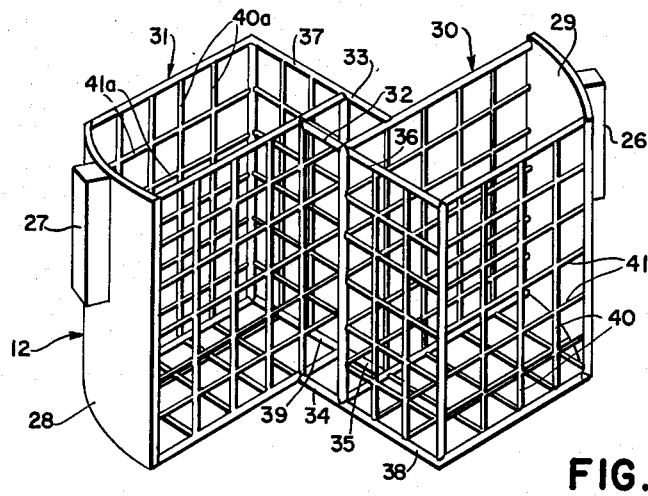
FIGURE 5 is an isometric view of a form of article holding unit.
Figure 6:
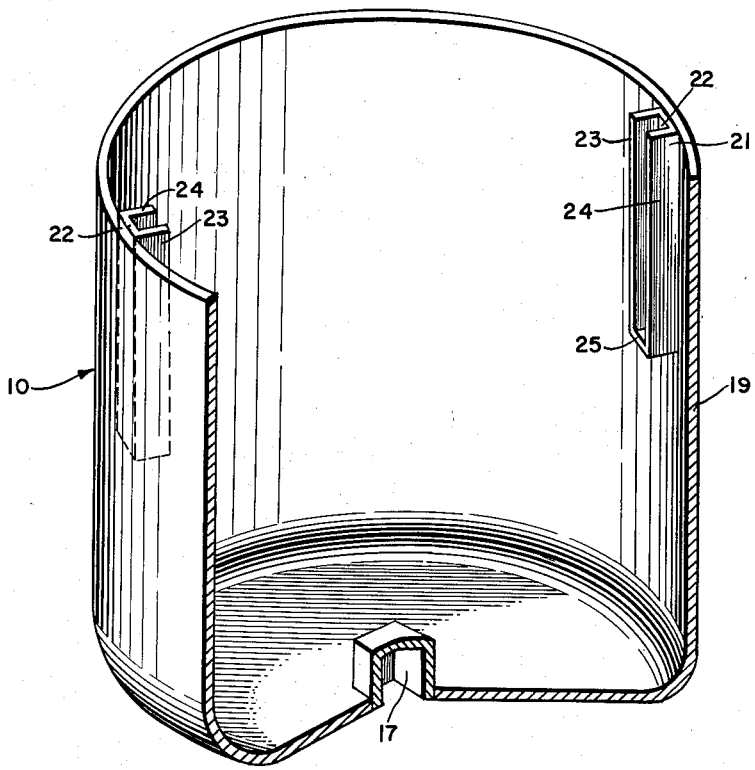
FIGURE 6 is an isometric view taken on a much enlarged scale with parts broken away and parts shown in section of the tank.

Referring more particularly to the drawings, 10 designates a tank unit, 11 a motor base unit and 12 an article holding unit, as shown in FIGURE 5.

The base unit houses an electric motor 13 having its armature shaft 14 disposed upright or vertical adapted to be supplied with current from the building supply through a flexible plug-in unit 15.

The armature shaft 14 projects above the base unit 11, such projecting part being in the form of a square or other form of drive stud 16 shaped to accommodate a square or other form of drive socket 17 in the base 18 of the tank unit 10 which preferably has a circular upright wall 19. The tank is open at its upper end to detachably receive the basket unit. This upper end is closed by a cover 20 during the washing operation.

Supported within the upright tank wall are basket guide and support members 21, preferably two in number located preferably at diametrically opposite points on the circle of the tank upright wall 19. In the form of the invention illustrated these basket guide and support members 21 are of a generally channel form including base members 22 which are affixed as by welding or other fastening means to the internal surface of the tank wall 19.

From these base members project inwardly from the tank wall 19 pairs of spaced guide bars 23 and 24 connected at their lower portions by bottom or shelf walls 25. The members 22, 23 and 24 thereby form guide slots open at their upper ends to receive lugs 26 and 27 outstanding from the outer walls 28 and 29 of a pair of article receiving baskets 30 and 31 mounted in offset relation and having suitable connections to bind the two baskets 30 and 31 together as a unit whereby the same may be lowered into and lifted from the tank 10.

In the form of the invention shown in the drawings, particularly in FIGURE 5, these connections are advantageously formed by rods 32 and 33 at the upper portions of the baskets and 34, 35 at the lower portions of the baskets. This forms an open-work structure similar to that of the basket walls to permit the free flow of the liquid contained in the tank 19 freely through the basket walls to permit of the circulation of the liquid as the tank 10, including the baskets, are rotated or oscillated as hereinafter described.

As shown in FIGURE 5, the connecting rod 32 may be a part of, or an extension of, an upper bar 36 of the basket 30 while the companion upper connecting rod 33 may be a part of, or an extension of, an upper bar 37 of the companion basket 31.

The lower connecting rod 34 may be a part of, or an extension of, a lower end bar 38 of the basket 30 while the other lower connecting rod 35 may be a part of, or an extension of, a lower end bar 39 of the basket 31.

These connecting rods 32, 33, 34 and 35 are a convenient practical form of rigid connection between the baskets 30 and 31 but obviously other forms of connection may be employed.

The rod arrangement 32, 33, 34 and 35 is particularly applicable where the baskets are formed of vertical and horizontal intersecting rods or wires 40 and 41 for the basket 30 and 40$^a$ and 41$^a$ for the companion basket 31. Other forms of basket well may obviously be employed provided the same are of open walled construction, except for the outer walls 28 and 29 which are preferably of sheet or solid material in order to appropriately carry the load of the contents of the baskets through the support of the lugs 26, 27 and the basket guide and support members 21.

A feature of the invention is to provide a large capacity of basket space without necessarily involving a too great diameter of tank 10 for the purpose of retaining the small dimensions of the machine. Obviously if the baskets 30, 31 were placed end to end diametrically across the tank 10 it would require a larger diameter tank for a given capacity of basket. By offsetting the baskets 30 and 31 and overlapping the same, the diameter of the tank 10 can be kept within small dimensions suitable for accommodating the machine in household cabinets or other places of restricted space.

The intersecting components 40, 40$^a$, 41, 41$^a$ of the baskets may be formed of a rubber, resin or plastic compound or these components may be of metal, rubber or plastic coating for the purpose of insuring the safety of the dentures when rubbing the sides of the baskets.

In the use of the device the tank unit 10 may be lifted off the motor base unit 11, conveyed to a table or support and the lid 20 removed exposing the basket unit, the upper ends of the baskets being open as appears in FIGURE 5. This unit may be lifted out of the tank 10 if desired or the dentures, articles of jewelry or other small articles to be cleaned are then loaded into the upper open ends of the duplex basket unit.

Figure 1:
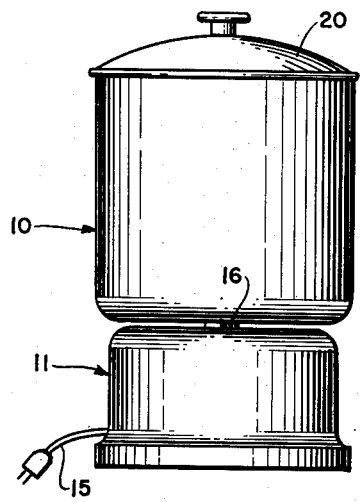
FIGURE 1 is a side elevational view of an assembled washing machine for small articles pursuant to the invention.
Figure 2:
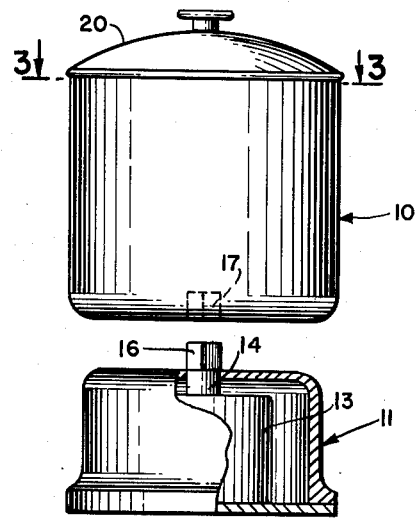
FIGURE 2 is a similar view showing the tank unit elevated above the motor base unit.
Figure 3:
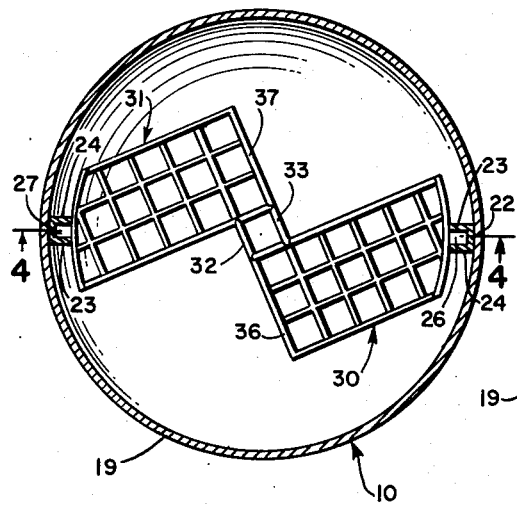
FIGURE 3 is a horizontal sectional view through the tank unit taken on a magnified scale on the line 3—3 in FIGURE 2.
Figure 4:
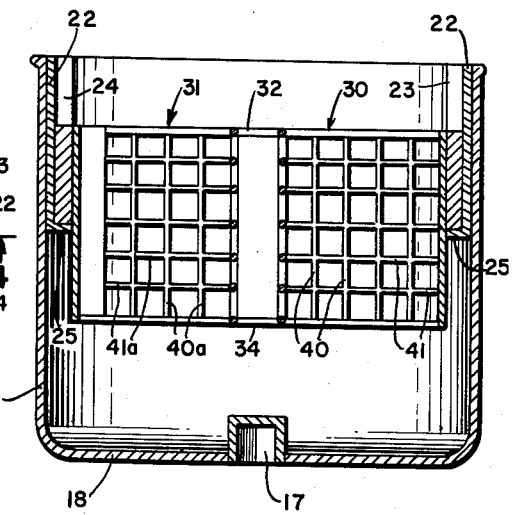
FIGURE 4 is a vertical sectional view taken on the line 4—4 in FIGURE 3.

If the basket has been removed from the tank it is thereupon returned by bringing the basket unit to a position poised above the open tank 10 with the lugs 26 and 27 immediately above the guide slots formed between the spaced guide walls 23 and 24. The basket is thereupon lowered with the lugs 26 and 27 entering the slots and in the final position resting upon the ledges or shelves 25 which will bring the basket to an appropriate elevation within the tank 10; for instance as shown in FIGURE 4.

Before or after the basket unit is placed in the tank, the tank may be supplied with water and a cleansing powder or cleansing liquid up to an appropriate level which will preferably immerse all of the dentures or other articles which have been loaded into the baskets.

The cover 20 having been replaced and the tank unit 20 set upon the base unit 11 with the driving stud 16 occupying the drive socket 17, the motor 13 is energized by a suitable switch or by plugging in the element 15. The motor being thus put into operation oscillates the tank 10 and through the basket guide and support members 21 and lugs 26, 27, drives the basket unit proportionately. The tank will preferably oscillate back and forth causing the solution to pass in a swishing movement through the mesh or otherwise reticulated or foraminous walls of the basket.

In a relatively short period of time a thorough cleansing action has taken place; the motor may be shut off, the tank unit 10 removed, the lid lifted and the basket unit also lifted out of the tank and out of the solution for rinsing of the articles preparatory to removing the same from the baskets and drying.

Although I have disclosed herein the best form of the invention known to me at this time, I reserve the right to all such modifications and changes as may come within the scope of the following claims.

What is claimed is:

1. A washing machine for dentures and small articles comprising
   (a) a tank adapted to contain cleansing liquid having
   (b) an upright substantially cylindrical wall,
   (c) means for oscillating the tank about an upright axis,
   (d) a basket unit for containing the articles comprising
   (e) at least two baskets,
   (f) complemental means between the upright tank wall and outer portions of the baskets for supporting the baskets in the tank in a relation in which from outer to inner portions the baskets diverge to opposite sides of a diameter of the upright wall into at least partial lapping relation, and
   (g) a substantially rigid uniting structure bridging the gap between the lapping portions of the baskets and connected to inner portions of the baskets for forming therewith a rigid structure across the cylindrical wall between said complemental means.

2. A washing machine as claimed in claim 1 in which said complemental means further comprises
   (h) means entraining the basket unit to rotate with the tank, and
   (i) means for blocking any oscillating or rocking movement of the basket unit relatively to the tank.

3. A washing machine as claimed in claim 1 in which said complemental means comprises
   (h) vertically elongated lugs on the outer end portions of the baskets, and
   (i) pairs of spaced guide bars projecting inwardly from the inner surface of the upright tank wall in position to detachably and slidably snugly receive the lugs over vertically elongated contacting surfaces to react together to drive the basket unit with the tank and oppose oscillating movement of the basket unit relatively to the tank.

4. A washing machine as claimed in claim 3 further comprising
   (j) outer rigid walls included in the baskets,
   (k) said outer rigid walls being arcuate,
   (l) said lugs affixed to said outer rigid arcuate walls in an orientation in which when entered between the guide bars will direct the baskets to said divergent relative relation.

5. A washing machine as claimed in claim 1 in which said complemental means
   (h) is located at opposite end portions of said diameter with a
   (i) central point of the uniting structure also on said diameter and at substantially the center of the circle on which the cylindrical upright tank wall is struck.

References Cited in the file of this patent

UNITED STATES PATENTS

| | | |
|---|---|---|
| 1,653,539 | Benn | Dec. 20, 1927 |
| 1,753,462 | Geery | Apr. 8, 1930 |
| 1,917,829 | Cole | July 11, 1933 |
| 1,932,097 | Biggs | Oct. 24, 1933 |
| 2,929,254 | Gustafson | Mar. 22, 1960 |